E. FULDA.
PROCESS AND PRODUCT OF ELECTRIC WELDING.
APPLICATION FILED NOV. 23, 1918.
1,344,125.
Patented June 22, 1920.
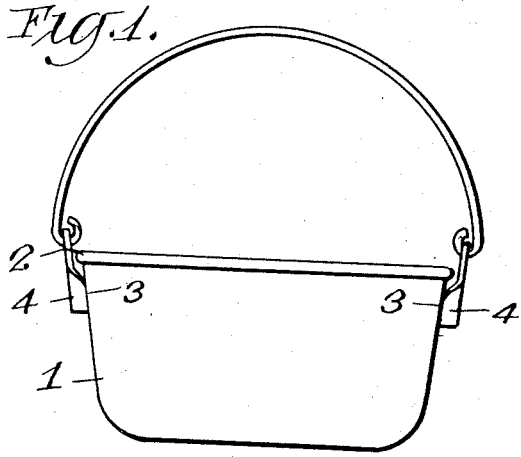
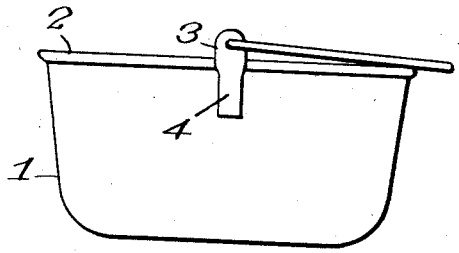
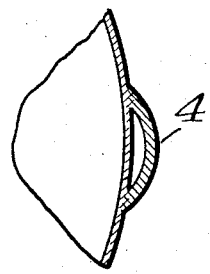
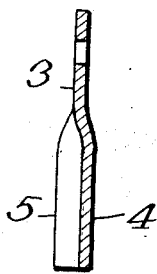
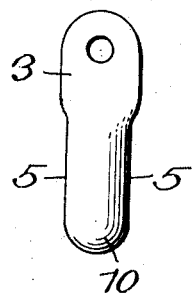
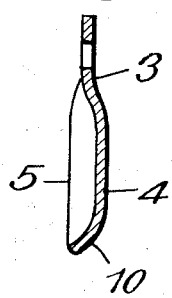
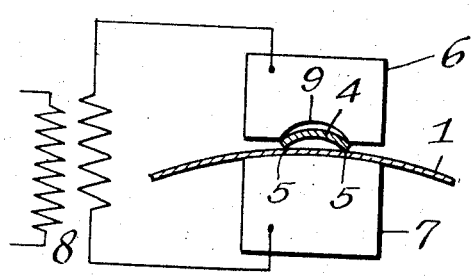
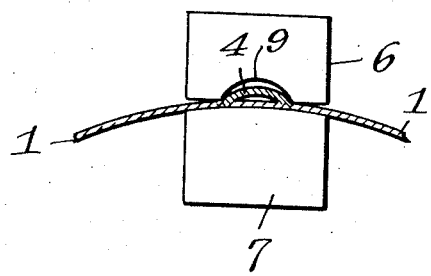
INVENTOR
Edward Fulda
BY
Townsend & Decker
ATTORNEYS

UNITED STATES PATENT OFFICE.

EDWARD FULDA, OF NEW YORK, N. Y.

PROCESS AND PRODUCT OF ELECTRIC WELDING.

1,344,125.     Specification of Letters Patent.     Patented June 22, 1920.

Application filed November 23, 1918. Serial No. 263,802.

*To all whom it may concern:*

Be it known that I, EDWARD FULDA, a citizen of the United States, and a resident of New York, in the county of New York and State of New York, have invented certain new and useful Improvements in Processes and Products of Electric Welding, of which the following is a specification.

My present invention relates to a process of electrically welding two sheet metal parts face to face and to the product resulting from such process.

The object of the invention is to join the parts quickly and secure a strong, smooth union with the use of an exceedingly small amount of current.

The invention is particularly adapted for welding the bail-ears, spouts or other projecting parts to sheet metal cooking or similar utensils as the process is practised so quickly and consumes such a small quantity of current that the cost is exceedingly low and a smooth joint is obtained which does not interfere with the coating of enamel usually applied as a finish to the utensil.

The invention consists in the improved process of electrically welding sheet metal parts and in the product resulting therefrom, all as more particularly hereinafter described and then specified in the claims.

In the accompanying drawings:

Figure 1 is a side elevation of a cooking utensil constructed in accordance with this invention.

Fig. 2 is a similar view taken at right angles to that shown in Fig. 1.

Fig. 3 is an enlarged cross-section taken on the line 3—3 of Fig. 1.

Fig. 4 is an enlarged longitudinal cross-section through a bail-ear formed in accordance with this invention.

Fig. 5 is a fragmentary view showing the parts assembled between the current supplying contact-blocks or electrodes of an electric welding machine.

Fig. 6 is a similar view at the end of the welding operation.

Figs. 7 and 8 are front elevation and longitudinal section through a bail-ear of a modified form.

The invention is illustrated and will be described as applied to securing a bail-ear to the utensil body but it will be understood that it can be equally well employed for securing other parts of the utensil.

Referring to the drawings, 1 indicates the body of the utensil formed of sheet metal in any desired manner and provided with the usual reinforcing edge 2. 3 indicates the bail-ear usually of heavier gage metal and which is formed, at least as regards that part which is secured to the utensil body, in a special manner to adapt it to be quickly and economically welded to the side of the utensil. The part of the bail-ear which engages the body is convexed, as shown at 4 so that its side edges 5 form an acute angle with the surface of the utensil and contact therewith only along a sharp corner when the two parts are brought in contact. The upper part of the ear is by preference flat and bent outwardly to clear the reinforced edge 2 although if desired the greater part or the whole length of the ear may be convex in transverse cross-section.

After being so prepared the ear 3 and utensil 1 are assembled face to face between current supplying blocks 6, 7, the edges 5 making a line contact with the surface of the utensil.

The contact blocks 6 and 7 form the terminals of the secondary of a transformer 8 and are embodied as part of an electric welding machine of any desired and suitable construction as will be readily understood by those skilled in the art. The lower block 7 forms a seat for the work and the upper block 6 is provided with a concave groove 9 preferably of sharper curvature than the part 4 of the ear and of slightly less width so that when brought down on the ear it will only make contact with it directly in back of the corners of the ear which contact with the surface of the utensil.

Upon passage of the current from one contact block to the other across the contacted portions of the ear 4 and utensil 1, such contacted parts immediately reach a welding heat owing to the extremely narrow contact formed by the corner edge of the ear and upon the application of pressure by means of the block 6 the side edges sink into the wall of the utensil and become welded thereto as indicated in Figs. 3 and 6. A weld so made is practically instantaneous and may be termed a "flashweld". As the current passes only an exceedingly small fraction of time but little current is consumed. The resultant weld between the parts makes a smooth surface with the utensil and does not present any sharp edges or corners to interfere with the proper enameling of the utensil.

In the form shown in Figs. 1 to 6 inclusive, an open passage between the ear and the utensil body is provided but if it is desired to form a pocket closed at the bottom, the form of the ear may be modified as shown in Figs. 7 and 8. In this form the lower edge of the ear is also curved inwardly at 10 resulting in a sharp corner 11 which contacts with and welds to the body of the utensil in the same manner and operation as the edges 5.

It will be understood that the invention is not limited to the particular use described but is of general application in the arts.

What I claim as my invention is:—

1. Process of electrically welding an ear or other sheet metal part to a metal body consisting in deforming the ear or part so that a corner only of the edges will engage the body and make a line contact therewith, applying an electrode contacting with the ear only in back of the contacting edge, passing an electric heating current across said line contact and applying pressure to weld the ear to the body along said edges.

2. The process of electrically welding two pieces of sheet metal face to face, consisting in deforming one of the pieces so that a corner of the edge is presented to the other piece, contacting said pieces so that one makes a line contact with the other, applying a heating electrode to one of said contacts but only making contact with said part in back of the line contact, passing an electric current through the pieces and applying pressure whereby the pieces are welded together along said edge.

3. The process of electrically welding two pieces of sheet metal face to face, consisting in deforming one of the pieces so that the side edges contact with the other piece at the corner of said edges only, applying an electrode having a grooved contact face of sharper curvature than the deformed piece to said piece and whereby said electrode only contacts with said piece directly in back of the contacting edges and electrically uniting said parts by a flash weld along said edges.

4. A new article of manufacture comprising a piece of sheet metal having a convex part welded to another metal sheet along the edges of the convex part.

5. A sheet metal utensil having a bail-ear or other projecting part provided with a convex portion welded by its edges to the body of the utensil.

6. A sheet metal utensil having a bail-ear provided with a convex portion, the edges of which are embedded in and welded to the body of the utensil.

Signed at New York, in the county of New York and State of New York, this 21st day of November, A. D. 1918.

EDWARD FULDA.

Witnesses:
C. F. TISCHNER,
GEORGE E. BROWN.